June 18, 1963  J. R. WYLLIE ETAL  3,093,913
TEACHING DEVICE
Filed July 19, 1961  2 Sheets-Sheet 1
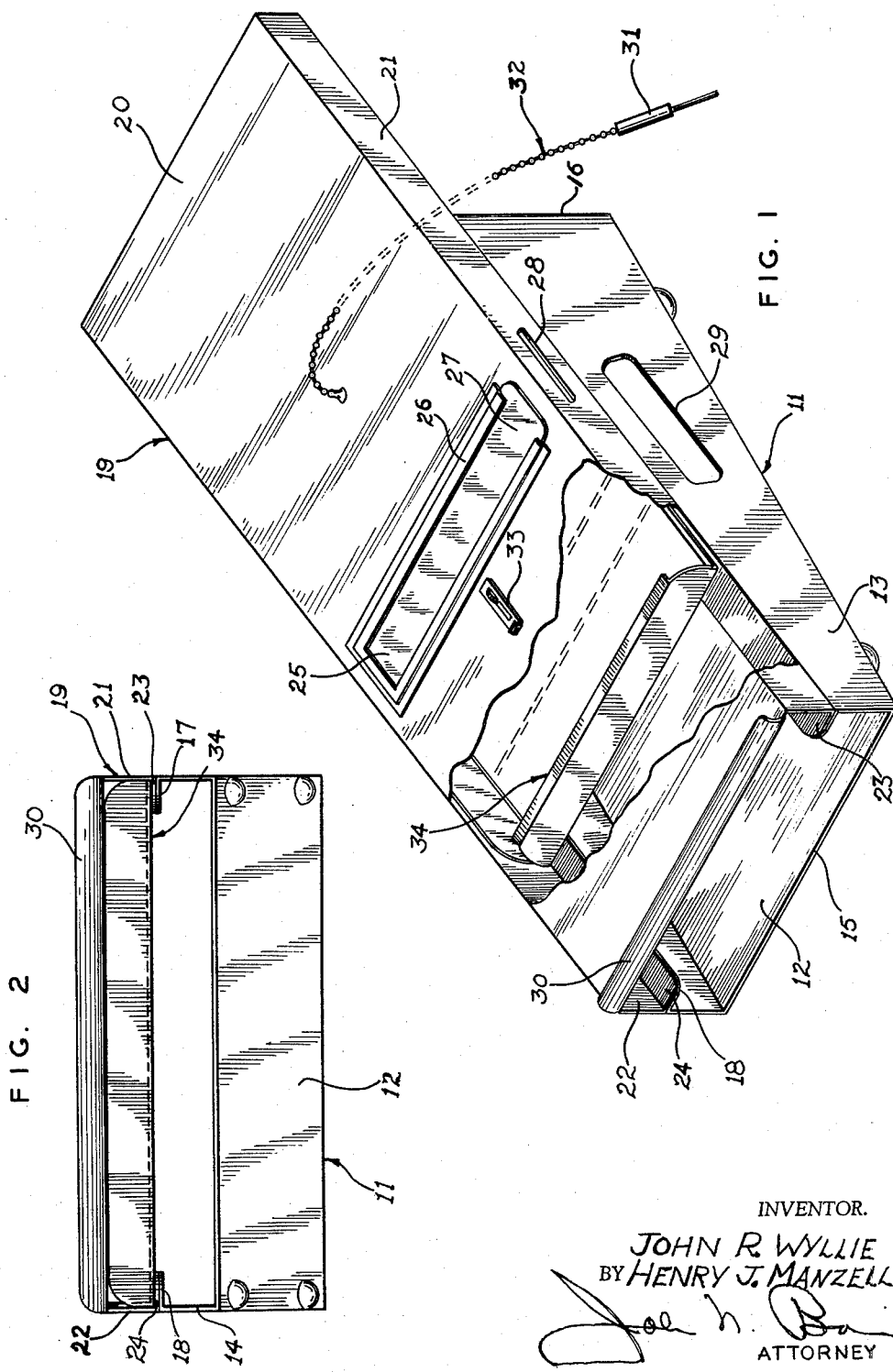
INVENTOR.
JOHN R. WYLLIE
BY HENRY J. MANZELLA
ATTORNEY

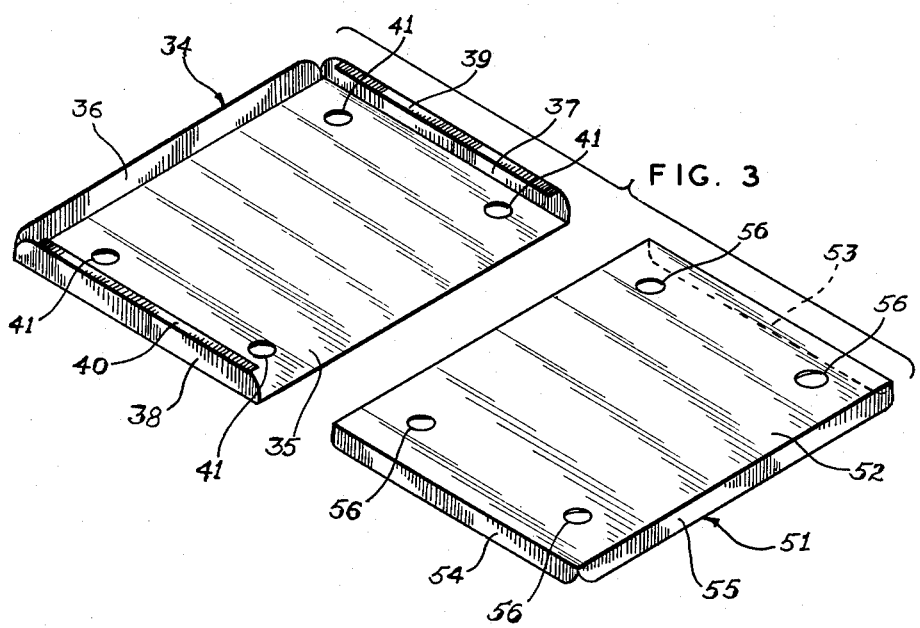
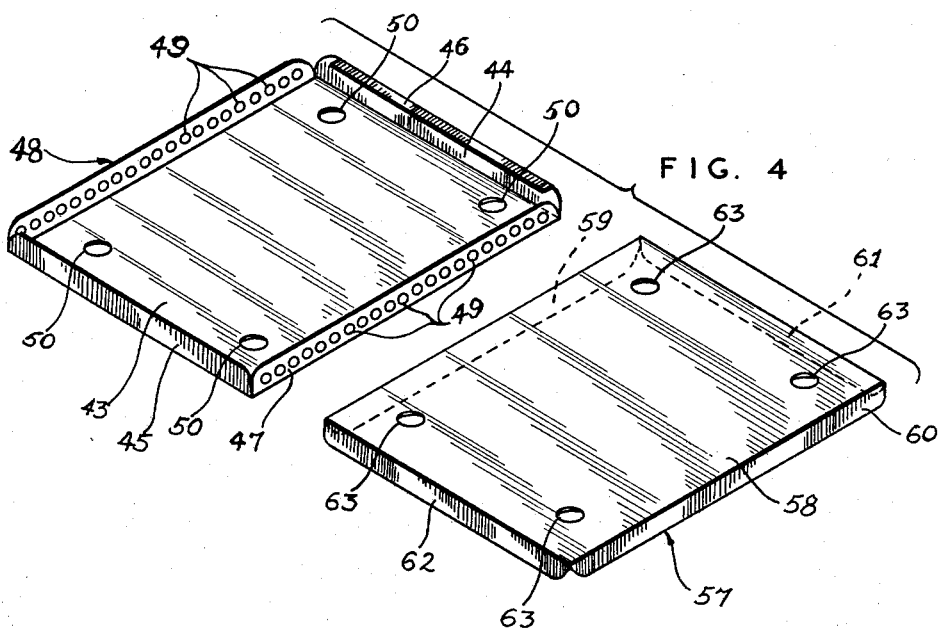

United States Patent Office 3,093,913
Patented June 18, 1963

3,093,913
TEACHING DEVICE
John R. Wyllie, 17 Oliver St., Chatham, N.J., and Henry
J. Manzella, 238 Shepard Ave., East Orange, N.J.
Filed July 19, 1961, Ser. No. 125,158
6 Claims. (Cl. 35—9)

Our invention relates to teaching devices generally and specifically to a mechanically operated device whereby the student may read instructive material, answer questions relating thereto, compare his answer to a correct answer and review both his answer, the correct answer, and the instructive material at any time.

Classic teaching employs two basic methods, reading instructive material and listening to instructive lectures. In addition, demonstrative instruction may be employed which is fundamentally a combination of visual observation, analagous to reading, and auditory perception, analagous to a lecture. This combination may take the form of a physical demonstration by the instructor or visual aids such as movies, slides and the like.

Each of the basic methods and any combination thereof, possess an inherent limitation, each student will not absorb the same quantum of information or understanding as the next. Moreover, from time to time, even the same student will not achieve the same degree of learning. Thus, there results certain areas of vague or incomplete understanding upon the part of the student or complete misunderstanding which the teacher cannot isolate. Ideally, there should be one teacher for each student so that complete instruction might be realized within the limits of ability of each student. Obviously, this is impractical. However, we have invented a device which, to a high degree, provides such individual teaching for each student.

Various types of teaching devices are known. All have one common limitation. All devices incorporate instructive material prepared by experts and frequently keyed to a particular text book. This material is printed on special belts, slides or the like suitable for incorporation and display by a particular machine. The teacher is, therefore, forced to employ a sterotyped instructive course for all students. This system is largely self-defeating. The object of such a machine is to individualize instruction as much as possible. Provisions should be made for the teacher to quickly and easily adjust his instructive material to the speed and depth of understanding desired and to the general ability level of the class. This is essential since some students will learn more quickly and thoroughly than others. Moreover, the teacher must employ the particular text book to which the machine's instructive material is keyed which is frequently impractical. Still further, if the text book should go out of print or a new addition be published, new instructive material must be prepared by the manufacturer of the machine. Even insertion of new material in the machine can be difficult and can introduce the danger of damage to complicated and expensive parts by manipulation by inexperienced hands.

Another defect common to many teaching machines lies in the fact that the student is unable to review and re-evaluate the instructive material after answering questions relating thereto. Such review is actually an essential part of the teaching process.

Therefore, it is among the objects and advantages of our invention to provide a teaching device for which each teacher may prepare his own instructive material and questions relating thereto, keyed to the ability level of the class and the use of companion teaching aids such as text books, movies, and lectures, and quickly and easily incorporate such instructive material in the machine without resort to special belts, slides, or the like and without opening, dismantling, or otherwise manipulating complicated machinery.

Another object of our invention is to provide a teaching device in which relatively short, discrete, easily comprehended portions of a specific lesson may be progressively presented to the student.

Yet a further object of our invention is to provide a teaching device in which questions are propounded to the student relating to instructive material previously presented, answers are made by the student on a separate sheet, and means are provided for the student to compare his answer with the correct answer.

Still another object of our invention is to provide a teaching device in which the student may review the instructive material after answering questions relating thereto.

A further object of our invention is to provide a teaching device in which the instructive material and questions relating thereto may be prepared on ordinary paper by any convenient means such as pen, pencil, typewriter, or the like and reproduced by any one of a number of well known methods such as mimeograph, ozalid or the like.

Yet another object of our invention is to provide a teaching device which is powered by hand, has no complicated mechanical parts, and no electrical circuits.

Still a further object of our invention is to provide a teaching device which cannot be damaged by tampering with delicate mechanisms or even by accidental dropping.

A further object of our invention is to provide a teaching device in which parts of the device are adapted to function as a storage drawer for instructive material when separated from the machine.

Still another object of our invention is to provide a teaching device which may be stacked together within a minimum of space.

These objects and advantages as well as other objects and advantages may be achieved by our invention, one embodiment of which is illustrated in the drawings in which:

FIGURE 1 is a view in perspective of our teaching device with a portion shown cut away.

FIGURE 2 is an end view of our teaching device shown in FIGURE 1 looking in a plane parallel to the inclined top thereof.

FIGURE 3 is a view in perspective of a pair of telescoping trays.

FIGURE 4 is a view in perspective of an alternative pair of telescoping trays.

Referring now to the drawings in detail. Our teaching devices comprises a base 11. The base 11 has a flat, generally horizontal bottom 12 which is provided with a pair of opposed, generally vertical side walls 13, 14 formed integrally thereon. The side walls 13, 14 become progressively higher moving from the front 15 to the rear 16 of the base 11. The top of each side wall 13, 14 is provided with an inwardly extending flange, respectively, 17 and 18. The flanges 17 and 18 incline upwardly from the front 15 to the rear 16 of the base 11.

A top 19 is secured to the base 11. The top 19 comprises an upwardly inclined, flat platform 20 having a pair of vertically depending side walls 21, 22 formed integrally thereon. The bottom of each side wall 21, 22 is provided with an integral, inwardly extending flange respectively, 23 and 24. Flanges 23, 24 on the top 19 are secured respectively to flanges 17 and 18 on the base 11 by some convenient means such as tap welds.

The platform 20 on the top 19 is provided with a window 25 approximately midway between its ends. A flange 26 is provided on the platform 20 of three sides of the window 25 and is adapted to slidably receive a transparent covering 27 preferably of heavy plastic. Both side walls, 21 and 22 on the top 19 are provided with an elongated slot 28 generally parallel to the platform 20. Each side wall 13, 14 of the base 11 is provided with a relatively wide, elongated opening 29 generally parallel to the platform 20 on the top 19. The openings 29, 29 are wide enough to easily accommodate the hand. The platform 20 on the top 19 is provided with a generally arcuate, upturned end 30 at the front of the device. In addition, a stylus 31 may be secured to the platform 20 by some convenient means such as a chain 32. A clip 33 is mounted on the platform 20 beneath the window 25 and is adapted to secure a sheet of paper to the platform.

A tray 34 may be inserted in the open, front end of the top 19 to slidably engage flanges 23 and 24. The tray 34, shown in greater detail in FIGURE 3, is comprised of a generally flat bottom 35 having a width slightly smaller than the distance between the side walls 21, 22 of the top 19. Formed integrally on the bottom 35 of the tray 34 is a generally vertical, side wall 36 and a pair of opposed, generally vertical end walls 37, 38. The side walls 36 and end walls 37 and 38 are slightly shorter in height than the side walls 21 and 22 on the top 19. On the top of each wall 37, 38, is formed an inwardly extending flange, respectively, 39 and 40, each of which is generally parallel to the bottom 35. The bottom 35 is also provided with a plurality of holes 41. An alternative tray 42 is shown in detail in FIGURE 4. Tray 42 comprises a generally flat bottom 43 having formed integrally thereon a pair of generally vertical end walls 44 and 45. One end wall, 44, is provided with an inwardly extending flange 46 at its top. A pair of generally vertical side walls 47, 48 are formed integrally on each side of the bottom 43. The bottom 43 is provided with a plurality of holes 50.

A companion tray 51 is provided for tray 34. Tray 51 comprises a generally flat, bottom 52 having a pair of generally vertical end walls 53, 54 and a generally vertical side wall 55. The end walls 53, 54 and the side wall 55 are dimensioned slightly shorter than the side wall 36 and end walls 37, 38 than of the tray 34 in order that companion tray 51 will telescope under flanges 39 and 40 of tray 34 to form a storage case for instructive material. Of course, the dimensions of the bottom 52 of tray 51 are slightly smaller than those of bottom 35 of tray 34. In addition, the bottom 52 is provided with a plurality of holes 56.

Similarly, a companion tray 57 is provided for tray 42. Companion tray 57 comprises a generally flat bottom 58, a pair of opposed, generally vertical side walls 59, 60 and a pair of opposed, generally vertical end walls 61, 62, each formed integrally with the bottom 58. The side walls 59 and 60 and end walls 61 and 62 are dimensioned slightly shorter in height than those of tray 42 in order that companion tray 57 will telescope beneath flange 46 on tray 42 to provide a storage case for instructive material. Of course, the dimensions of the bottom 58 of tray 57 are slightly smaller than those of the bottom 43 of tray 42. In addition, the bottom 58 of tray 57 is provided with a plurality of holes 63.

In operation, instructive material is prepared on sheets which will lie within the bottom 35 of tray 34 or bottom 43 of tray 42. Written information on the sheets should be positioned so that it may be read through window 25 in the platform 20. Alternate sheets of instructive material are prepared with instructive material written thereon in the usual fashion progressively from the top of the sheet to the bottom. Periodically, the instructive material is interrupted with a question relating thereto. Beneath the answer, new instructive material is written. The new instructive material is then followed by another question and another correct answer. The sheet underlying the first sheet is prepared in a similar manner. However, the instructive material first appears at the bottom of the sheet and the first question relating thereto located above it. The answer to the first question lies above the first question on the sheet. Thereafter, above the correct answer, follows more instructive material. The window 25 may be made wide enough to easily accommodate a reasonable number of lines of instructive material so that the student need not read in an inverted manner but may read in the usual manner. The next underlying sheet of material is arranged in the manner of the first sheet and subsequent sheets of material are arranged in alternate form.

The instructive sheets are placed in either tray 34 or tray 42. The tray is slid into the front of the device to slidably engage flanges 23 and 24 on the top 19. A sheet of blank paper is placed upon the platform 20 beneath the window 25 and detachably secured thereto by clip 33. The student then pushes the tray inwardly towards the rear end 16 of the device. If tray 34 is employed, its movement is accomplished by inserting the fingers through opening 29 in the side wall 13 of the base 11 to engage the bottom 35 of the tray. Openings 29 are provided on both sides of the base 11 to accommodate both right and left-handed students. The opening 29 is so dimensioned and placed that the tray may be moved from the front end to the rear end of the inclined top 19. If tray 42 is employed, the tray is inserted in the top 19 to engage the flanges 23 and 24 in the usual manner. As the tray moves inwardly, the holes 49 in the sides 47 and 48 will be exposed along slot 28 in side wall 21 of the top 19. The stylus 31 may be inserted through the slot 28 and through the opposed holes 49 in the side wall 47 of the tray 42 and moved along the slot 28 to move the tray toward either end. Of course, a slot 28 is provided in the opposite side wall 22 of the top 19 and the tray 42 is provided with an opposite side wall 48 having holes 49 so that the device may be easily manipulated by a left-handed person.

After instructive material has been read and the question propounded, the student writes his answer on the blank sheet of paper detachably secured to the platform 20. The student then moves the tray again to expose the correct answer beneath the window 25. He is thus able to compare his answer with the correct answer. If he has any questions in his mind, he is able to move the tray in the opposite direction to review the instructive material and question.

The trays 34 and 42 and top 19 are so dimensioned that when the last written portion on the sheet appears beneath the window 25, the end of the tray will protrude from the rear end of the top 19. The tray is then withdrawn sufficiently to permit the student to remove the top sheet, placing it in one of the companion trays. The second sheet is then exposed. As set forth above, the instructive material, questions and answers, are arranged on the next sheet in the opposite order, that is, instructive material begins at the bottom of the sheet, the questions appear above the instructive material and the correct answer appears above the question. Thus, the tray may then be moved downwardly by the student in the manner described, the instructive material read, the questions propounded, the answer written by the student and the correct answer examined in the usual manner. Here too, the student may reverse the direction of the tray to review the instructive material if necessary.

Of course, our teaching device may be made with only openings 29 or slots 28 to accommodate only, respectively trays 34 and 51. For purposes of illustration, both expedients for achieving movement of the tray have been illustrated in a single drawing.

When the lesson has been completed, all of the sheets will lie in one of the companion trays, 51 or 57. The companion tray is then telescoped within the principal tray, 34 or 42 to form a case for storage. Holes 41, 56, 50 and 63 are provided in respectively trays 34, 51, 42 and 57 to facilitate removal of sheets therefrom. This may be accomplished by merely inserting the tip of the finger through the hole to force the sheets away from the bottom of the tray.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. A teaching device comprising,
a base open at both ends,
a generally flat top on the base having an opening intermediate its ends, a pair of generally parallel sides on the base depending from the top,
a tray slidably mounted within the base beneath the top in between the sides, and means in the side walls adapted to receive means for sliding the tray from one end of the base to the other.

2. A teaching device comprising,
a base open at both ends,
a pair of opposed, upstanding side walls on the base having an opening, the opening adapted to receive means to engage a tray mounted within the base,
a generally flat top on the base having an opening intermediate its ends,
a tray slidably mounted within the base and adapted to slide beneath the opening in the top.

3. A teaching device comprising,
a base open at both ends,
a pair of opposed, upstanding side walls on the base,
a pair of opposed, inwardly extending flanges on the side walls within the base,
a generally flat top on the base above the flanges having an opening intermediate its ends,
a tray slidably mounted on the flanges within the base and adapted to slide beneath the opening in the top, and
means in the side walls adapted to receive means for sliding the tray from one end of the base to the other.

4. A teaching device comprising,
a base open at both ends,
a pair of opposed, upstanding side walls on the base having an elongated slot,
a generally flat top on the base having an opening intermediate its ends,
a tray slidably mounted within the base adapted to slide beneath the opening in the top, and
a pair of opposed, upstanding side walls on the tray having a plurality of holes, the holes in the side walls of the tray opposing the elongated slots in the side walls of the base.

5. A teaching device comprising,
a base open at both ends,
a pair of opposed, upstanding side walls on the base, the side walls being progressively taller from one end of the base to the other and having an opening intermediate their ends adapted to receive means to engage a tray mounted within the base,
an inclined, generally flat top on the base having an opening intermediate its ends,
a pair of opposed, inwardly extending flanges on the side walls of the base generally parallel to the inclined top, and
a tray slidably mounted on the flanges within the base and adapted to slide beneath the opening in the top.

6. In a teaching device, a tray slidably engaged to a base and adapted to receive means to move the tray with respect to the base comprising,
a generally flat, rectangular bottom,
a pair of opposed end walls on the bottom,
a pair of opposed side walls on the bottom each side wall having a plurality of holes, and
an inwardly extending flange on the top of one end wall.

References Cited in the file of this patent
UNITED STATES PATENTS

| | | |
|---|---|---|
| 876,278 | Mayerle | Jan. 7, 1908 |
| 2,069,372 | Knitter | Feb. 2, 1937 |
| 2,652,335 | Conti | Sept. 15, 1953 |
| 2,673,413 | Weber | Mar. 30, 1954 |